US011665216B2

(12) United States Patent
Cenzano Ferret et al.

(10) Patent No.: US 11,665,216 B2
(45) Date of Patent: *May 30, 2023

(54) REDUNDANT LIVE VIDEO STREAMING FOR FAULT TOLERANCE

(71) Applicant: Brightcove Inc., Boston, MA (US)

(72) Inventors: Jorge Cenzano Ferret, Boston, MA (US); Ted Krofssik, Boston, MA (US); Matthew Neil, Somerville, MA (US); Michael Harty, Quincy, MA (US); Yuriy Reznik, Seattle, WA (US)

(73) Assignee: Brightcove Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,852

(22) Filed: Dec. 6, 2021

(65) Prior Publication Data
US 2022/0094727 A1 Mar. 24, 2022

Related U.S. Application Data

(63) Continuation of application No. 16/870,645, filed on May 8, 2020, now Pat. No. 11,196,785.

(60) Provisional application No. 62/845,492, filed on May 9, 2019.

(51) Int. Cl.
*H04L 65/612* (2022.01)
*H04L 67/02* (2022.01)
*H04L 65/70* (2022.01)

(52) U.S. Cl.
CPC ............ *H04L 65/612* (2022.05); *H04L 65/70* (2022.05); *H04L 67/02* (2013.01)

(58) Field of Classification Search
None
See application file for complete search history.

(56) References Cited

U.S. PATENT DOCUMENTS

| | | |
|---|---|---|
| 2014/0344443 A1 | 11/2014 | Macinnis et al. |
| 2015/0052236 A1 | 2/2015 | Friedrich et al. |
| 2015/0200987 A1* | 7/2015 | Labrozzi ............... H04L 65/613 709/219 |
| 2016/0191934 A1 | 6/2016 | Kraiman |
| 2016/0191961 A1 | 6/2016 | Fisher et al. |
| 2017/0085936 A1* | 3/2017 | Sheffler ............ H04N 21/26258 |
| 2019/0122659 A1* | 4/2019 | Miller .................. H04N 21/235 |
| 2020/0077127 A1 | 3/2020 | Morrow |

* cited by examiner

*Primary Examiner* — Scott B Christensen
(74) *Attorney, Agent, or Firm* — Mughal IP P.C.

(57) ABSTRACT

A fault-tolerant, cloud-based system can comprise a redundancy control unit capable of switching between transcoded video streams output by two or more transcoders. The redundancy control unit outputs a manifest from one of the transcoded streams and, upon detecting a fault in the stream, can modify the manifest to switch to another of the transcoded video streams. The redundancy control unit can further modify the manifest to flag the discontinuity in the video stream, which allows the player to switch to the new transcoding video stream without error. Other embodiments can include additional redundancies to help provide additional fault tolerance.

20 Claims, 9 Drawing Sheets

410

```
#EXTM3U
#EXT-X-VERSION:3
#EXT-X-TARGETDURATION:4
#EXT-X-MEDIA-SEQUENCE:249
#EXT-X-DISCONTINUITY-SEQUENCE:0
#EXT-X-PROGRAM-DATE-TIME:2020-04-22T15:04:40.598Z
#EXTINF:4.0,
pulvwt0g_bc984c974ae34e1f8b9206e010e7aff5_media_251.ts
#EXT-X-PROGRAM-DATE-TIME:2020-04-22T15:04:44.598Z
#EXTINF:4.0,
pulvwt0g_00ee17865a784bca845d07d3db50e6f5_media_252.ts
```

420

```
#EXTM3U
#EXT-X-VERSION:3
#EXT-X-TARGETDURATION:4
#EXT-X-MEDIA-SEQUENCE:241
#EXT-X-DISCONTINUITY-SEQUENCE:0
#EXT-X-PROGRAM-DATE-TIME:2020-04-22T15:04:40.188Z
#EXTINF:4.0,
fp2uycds_a80bb96697e54a88961c9ea823b35b14_media_243.ts
#EXT-X-PROGRAM-DATE-TIME:2020-04-22T15:04:44.188Z
#EXTINF:4.0,
fp2uycds_351d3e8554b5444e89583e981e237715e_media_244.ts
#EXT-X-PROGRAM-DATE-TIME:2020-04-22T15:04:48.188Z
#EXTINF:4.0,
fp2uycds_ae1be45d45eb4e4cb5446e2e19a3f193_media_245.ts
#EXT-X-PROGRAM-DATE-TIME:2020-04-22T15:04:52.188Z
#EXTINF:4.0,
fp2uycds_4dc00dce00e1457b80999388adf0d66f2_media_246.ts
```

430

```
#EXTM3U
#EXT-X-VERSION:3
#EXT-X-TARGETDURATION:4
#EXT-X-MEDIA-SEQUENCE:225
#EXT-X-DISCONTINUITY-SEQUENCE:1
#EXT-X-PROGRAM-DATE-TIME:2020-04-22T15:04:40.598Z
#EXTINF:4.0,
pulvwt0g_bc984c974ae34e1f8b9206e010e7aff5_media_251.ts
#EXT-X-PROGRAM-DATE-TIME:2020-04-22T15:04:44.598Z
#EXTINF:4.0,
pulvwt0g_00ee17865a784bca845d07d3db50e6f5_media_252.ts
#EXT-X-DISCONTINUITY
#EXT-X-PROGRAM-DATE-TIME:2020-04-22T15:04:48.188Z
#EXTINF:4.0,
fp2uycds_ae1be45d45eb4e4cb5446e2e19a3f193_media_245.ts
#EXT-X-PROGRAM-DATE-TIME:2020-04-22T15:04:52.188Z
#EXTINF:4.0,
fp2uycds_4dc00dce00e1457b80999388adf0d66f2_media_246.ts
```

REDUNDANT LIVE VIDEO STREAMING FOR FAULT TOLERANCE

CROSS-REFERENCES TO RELATED APPLICATIONS

This application is a continuation of U.S. patent application Ser. No. 16/870,645, filed May 8, 2020, now U.S. Pat. No. 11,196,785, which claims the benefit of and priority to U.S. Provisional Patent Application No. 62/845,492, filed May 9, 2019, both of which are incorporated herein by reference. This application is also related to the following commonly assigned application filed on the same day as this application, which is also incorporated herein by reference:

U.S. patent application Ser. No. 17/457,861, filed on Dec. 6, 2021, titled FAULT TOLERANT LIVE VIDEO STREAMING SWITCHOVER;

BACKGROUND

Cloud-based live video streaming via the Internet can involve a chain of communicatively coupled components configured to relay (and process) the live video from a video source (e.g., a camera) to a player (e.g., a media software application executed on a computer, mobile phone, etc.) viewed by an end-user. A failure in any component of the live streaming delivery chain, however, can interrupt the viewing experience for that event, decreasing the quality of the user experience from the perspective of the end-user, and reducing the value of the live video to the video provider.

Traditional solutions help reduce the likelihood of an interrupted viewing experience by providing redundant video streams and switching from a faulty stream to an operative stream, if necessary. However, such solutions often require customized hardware and/or software at the video source, which can be expensive to implement.

BRIEF SUMMARY

Embodiments herein overcome these and other issues by providing a fault-tolerant, cloud-based architecture comprising a redundancy control unit capable of switching between transcoded video streams output by two or more transcoders. The redundancy control unit outputs a manifest from one of the transcoded streams and, upon detecting a fault in the stream, can modify the manifest to switch to another of the transcoded video streams. The redundancy control unit can further modify the manifest to flag the discontinuity in the video stream, which allows the player to switch to the new transcoding video stream without error. Other embodiments can include additional redundancies to help provide additional fault tolerance. Because these embodiments do not require specialized hardware and/or software at the video source (e.g., contribution encoders can common off-the-shelf encoders), they can be significantly more cost effective than traditional redundancy solutions.

An example method of providing fault-tolerant live video streaming, according to this description, comprises obtaining a first transcoded video stream from a first video transcoder and a second transcoded video stream from a second video transcoder, outputting a first manifest that uses video segments of the first transcoded video stream to provide a first output video stream, identifying a fault condition with the first transcoding video stream, and in response to identifying the fault condition, updating the first manifest to switch from using the video segments of the first transcoded video stream to provide the first output video stream to using video segments of the second transcoded video stream to provide the first output video stream.

An example system, according to this description, comprises a memory and one or more processing units communicatively coupled with the memory and configured to obtain a first transcoded video stream from a first video transcoder and a second transcoded video stream from a second video transcoder, output a first manifest that uses video segments of the first transcoded video stream to provide a first output video stream, identify a fault condition with the first transcoding video stream, and in response to identifying the fault condition, update the first manifest to switch from using the video segments of the first transcoded video stream to provide the first output video stream to using video segments of the second transcoded video stream to provide the first output video stream.

An example non-transitory computer-readable medium, according to this description, has instructions stored thereby, which, when executed by one or more processing units, cause the one or more processing units to obtain a first transcoded video stream from a first video transcoder and a second transcoded video stream from a second video transcoder, output a first manifest that uses video segments of the first transcoded video stream to provide a first output video stream, identify a fault condition with the first transcoding video stream, and in response to identifying the fault condition, update the first manifest to switch from using the video segments of the first transcoded video stream to provide the first output video stream to using video segments of the second transcoded video stream to provide the first output video stream.

BRIEF DESCRIPTION OF THE DRAWINGS

FIG. 4 provides an example of how a manifest may be modified to help minimize issues at a player arising from a switch from one video stream to another.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Internet streaming is a model of continuous media delivery & playback utilizing one of the existing chunked delivery protocols, such as DASH [1], HLS [2], or others. It can be used for delivering of videos originated from either live or pre-recorded sources. Traditionally, the implementation of streaming was done mostly on premise, with all transcoding, packaging and ad-splicing operations done by dedicated hardware components. However, in recent years, with the advent of cloud platforms, this model is changing, with more operations being executed in cloud. It can be noted that, as used herein, the terms "video feed" and "video stream" may be used interchangeably to refer to video data of a video that can be used to ultimately enable a video player to play back the video.

Figure 1:
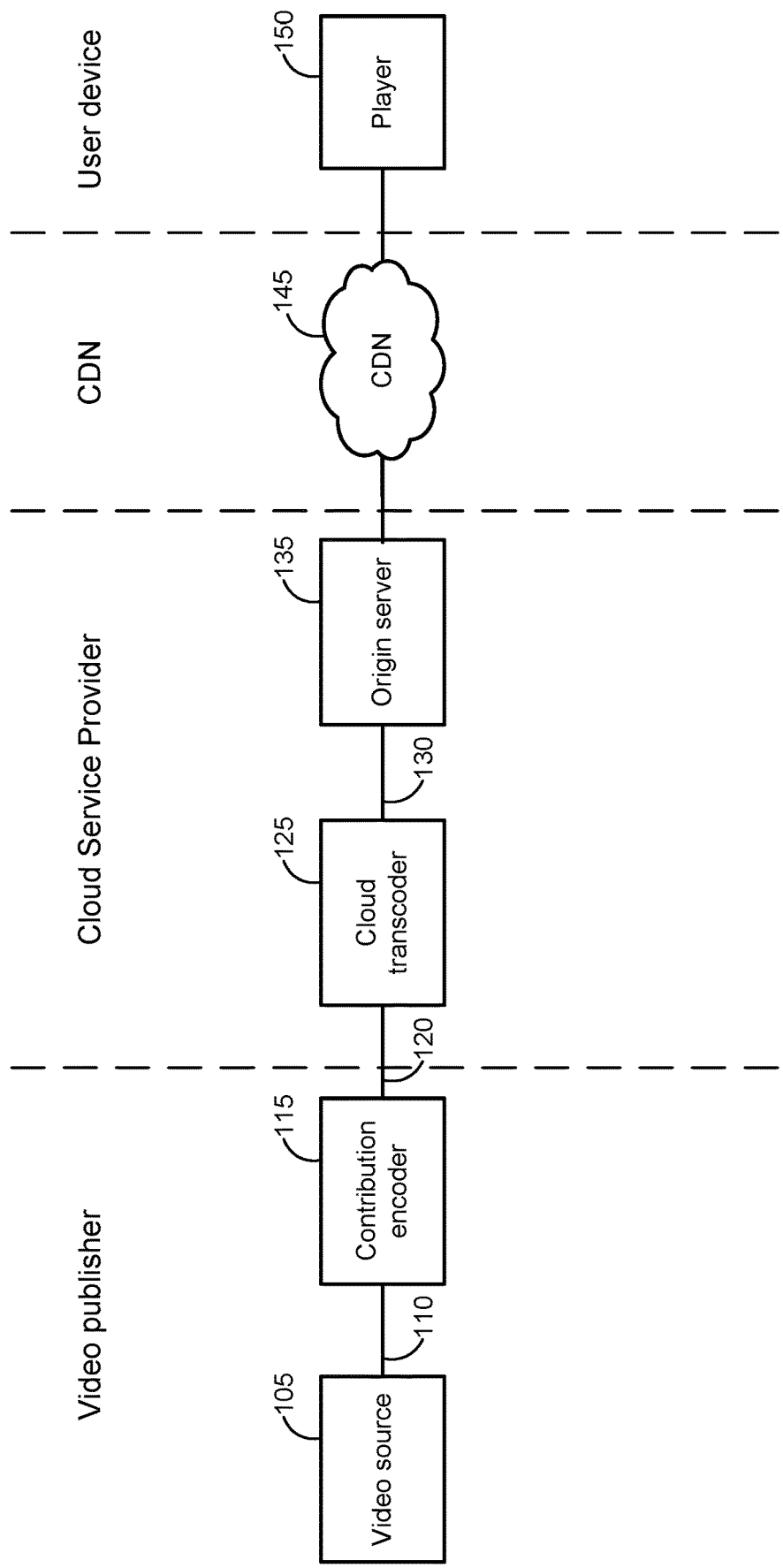
FIG. 1 is a block diagram illustrating the overall structure of modern-era cloud-based live video delivery chain.

FIG. 1 is a block diagram illustrating the overall structure of modern-era cloud-based live video delivery chain. In the figure, lines between components represent communication links from one component to the next. A person of ordinary skill in the art will appreciate that there may be many devices, networks, etc. used to provide this communication. The various entities involved in the video delivery chain (the video publisher, cloud service provider, Content Delivery Network (CDN), and user device may be communicatively connected, for example, via the Internet. Additionally, the various components shown in their respective blocks in FIG. 1 (video source 105, contribution encoder 115, cloud transcoder 125, etc.) may be executed by one or more computing devices, such as the computing device illustrated in FIG. X2, which is described herein below. (The computing device may comprise part of and/or be integrated into a larger device, such as a media player, video camera, etc.)

The input video in this chain originates from a video source 105, which, for example, can be a production video camera filming a live event. The output 110 from the video source 105 is provided to a contribution encoder 115, which converts the video in raw input format (e.g., uncompressed video delivered over Serial digital interface (SDI)), to a format suitable for transmission of video over the internet. This format could include, for example, a Transport Stream (TS) stream, TS stream+Forward Error Correction (FEC), Real-Time Messaging Protocol (RTMP), or Secure Reliable Transport (SRT) stream. As indicated in FIG. 1, these portions of the video delivery chain can be performed by the video publisher.

Once formatted by the contribution encoder 115, the output 120 (e.g., a video stream formatted for transport over the Internet) can be sent to a cloud service provider. The cloud service provider can first transcode the incoming video stream into one or multiple output formats using the cloud transcoder 125. The format(s) of the output 130 of the cloud transcoder 125 and can include, for example, Hyper-Text Transfer Protocol (HTTP) Live Streaming (HLS), Dynamic Adaptive Streaming over HTTP (DASH) format, and/or another chunked media delivery format as commonly used for CDN-assisted HTTP-based delivery. In some embodiments, the output 130 of the cloud transcoder 125 also may be altered by ad-insertion processing logic and then placed on the origin server 135. The origin server 135 then serves as an input for CDN-assisted delivery.

The final receiver of live video stream is a player 110, operating on a user device, such as personal computer (PC), mobile phone, tablet, or television, which uses a player 150 (e.g., software application) to retrieve chunks of encoded streams from CDN 145. The player 150 then decodes the encoded streams to reproduce the decoded media on the device. For any given live video stream, there may be any number of players 150 (dozens, hundreds, thousands, etc.).

A failure in any component of the live streaming delivery chain (contribution encoder 115, cloud transcoder 125, origin server 135, etc.) can interrupt the viewing experience for a user of the user device on which the player 150 is executed. This problem is well known in any video delivery model (broadcast, cable, Over-The-Top (OTT)). However, with cloud-based OTT delivery the problem is particularly difficult to solve because of the distributed nature of computing resources and the lack of control of latencies and quality of connections between them. Some solutions have been made utilizing proprietary hardware to ensure exact synchronization between different media streams. This exact synchronization, however, can be difficult to achieve, and such solutions are therefore typically relatively expensive, computationally intensive, and therefore difficult to scale.

According to embodiments herein, these and other issues can be overcome by providing a fault-tolerant live streaming system is proposed. The fault tolerance is achieved, according to some embodiments, by performing live ingest, encoding, ad-insertion, and delivery operations in parallel, utilizing multiple (redundant) instances of encoders, ad servers, and origin servers. In the event when instances delivering current live streams become unavailable or unstable, the system can allow for switching between redundant instances to enable the continued delivery of the video stream to the user device. Different embodiments can include different architectures and different methods of handling of switches between such encoders and origin servers in a way that minimizes discontinuity and Quality of Experience (QoE) impact in case of such switches. Practical advantages of the proposed system include, for example, superior reliability, low implementation and operational costs (which enhances scalability), and ability to achieve the result without modifying ingest workflows or imposing restrictions on the input(s).

In principle, the established approach for achieving higher fault-tolerance in many practical systems relies on introduction of redundancies. In case of system depicted in FIG. 1, the redundancies can be introduced in forms of two or more contribution encoders 115, contribution feeds 120, cloud transcoders 125 (and corresponding ad-insertion servers, if any), origin servers 135, and/or multiple CDNs 145. However, such redundancies must also be coupled with means of detecting which of the redundant components is failing and the switch of the delivery to a healthy version.

Figure 2A:
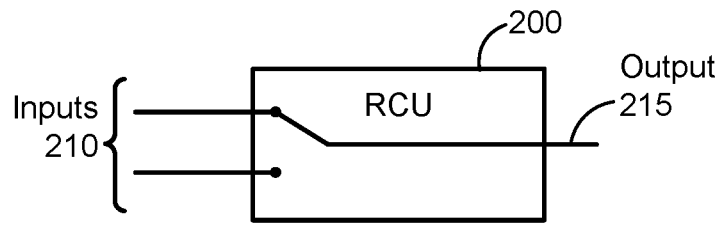
FIGS. 2A-2C. are diagrams of switching mechanisms that may be utilized in a fault-tolerant live video delivery system, according to some embodiments.
Figure 2B:
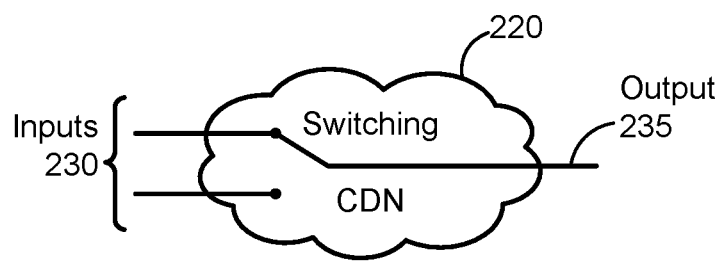
Figure 2C:
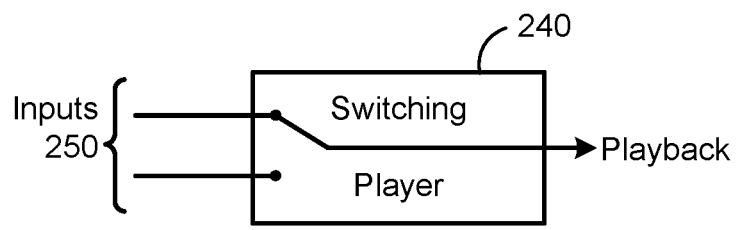

There are several mechanisms of switching that can be utilized, as depicted in FIGS. 2A-2C. (Again, it can be noted that although embodiments illustrated show switching capabilities between two inputs, alternative embodiments may be capable of switching between any number of two or more inputs.) FIG. 2A, for example, is a diagram illustrating an in-cloud "redundancy control unit," or RCU 200. An RCU 200 comprise cloud instances running code that listens for input data coming on inputs 210 from two or more other cloud-based processing units (e.g., transcoders). In the event when one of those units becomes unresponsive, the RCU 200 can switch from an input 210 from the unresponsive unit to another input 210 that appears to be more healthy and providing an output 215 corresponding to the healthy input.

The use of an RCU 210 can provide a developer of the cloud processing chain best control over how such switching can be implemented, and what adjustments (if any) will need to be made in the bitstreams that are being sent to the output 215 to minimize or prevent the appearance of discontinuities in content in the event of such switching.

A disadvantage of reliance on pure cloud-level switching is that it may be limited to managing problems introduced before or while content is being processed in the cloud. If problems happen later in the chain (e.g. at origin server 135 or CDN 145), alternative switching mechanisms may need to be used. Additionally, RCUs 210 by themselves may be susceptible to faults (e.g. the cloud instance running them may become unstable), and therefore exclusive reliance on such mechanisms may not make the system entirely fault tolerant in principle.

FIG. 2B is a diagram illustrating a switchable CDN 220 comprising CDN-level switching logic. The switching logic enables the CDN to switch (or distribute traffic load) between inputs 230 received from two or more origin servers 135, in the event if one of the origin servers 135 becomes non- or less-responsive. Such functionality, if available, and can be programmed to implement rapid switches between inputs 230 in the event of failure from an origin server 135.

FIG. 2C is a diagram illustrating a switching player 240 having player-side switching logic. The switching player 240 is able to switch between different sources (Uniform Resource Locators (URLs)) of media segments during streaming session. This functionality may be enabled by both HLS and DASH specifications, in which one a list of alternative URLs with media segments may be specified in manifests. Thus the switching mechanism performed by the switching player 240 can provide continuous playback in the event that the point failure is the CDN 145 itself.

The three means of switching shown in FIGS. 2A-2C can provide complementary means of ensuring fault tolerance and may be used in various embodiments of fault-tolerant live video streaming chains, as discussed in the following embodiments.

Figure 3:
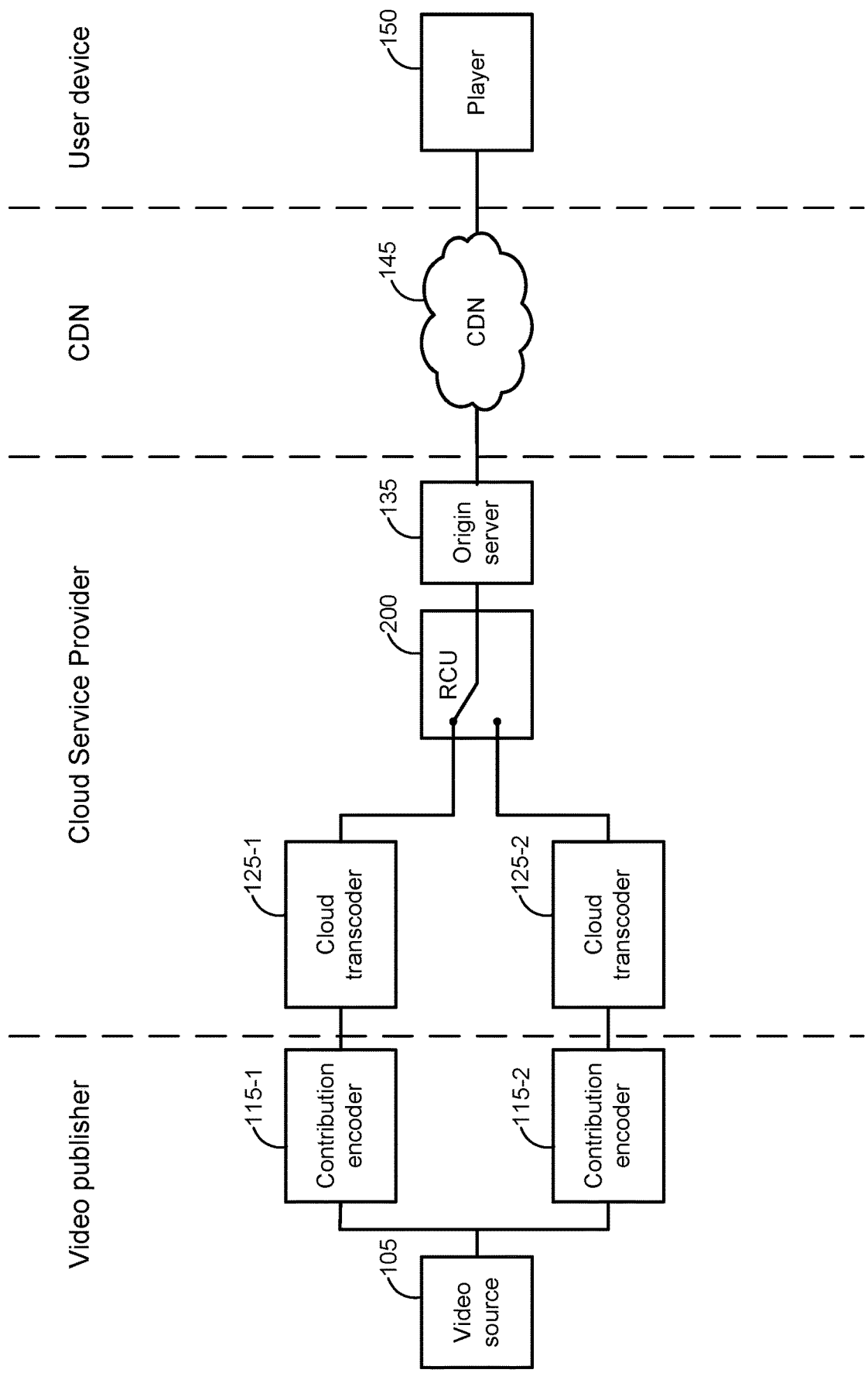
FIG. 3 is a block diagram of a fault-tolerant video delivery system with post-transcoder switch, according to an embodiment.

FIG. 3 is a block diagram of a fault-tolerant video delivery system with post-transcoder switch, according to an embodiment. As can be seen, the system utilizes a first contribution encoder 115-1 and second contribution encoder 115-2 providing output to a respective first cloud transcoder 125-1 and second cloud transcoder 125-2. Unlike systems in which synchronous encoding is required, the contribution encoders 115-1 and 115-2 in the system illustrated in FIG. 3 do not need to be synchronous. Feeds from contribution encoders 115-1 and 115-2 to cloud may also differ, and they may even use a different delivery protocol. Hence inputs to cloud transcoders 125-1 and 125-2 may not be perfectly synchronized. Because each cloud transcoder may output a video stream in final delivery formats (e.g., DASH or HLS), no separate step of repackaging of them is necessary.

In one alternative embodiment, the cloud transcoder is 125-1 and 125-2 may also include ad-insertion functionality, where, at some time intervals, the content of the original live feed becomes substituted by content coming from other sources. In another alternative embodiment, ad insertion functionality may be added as an extra logical unit located between RCU 200 and origin server 135.

The inputs to the RCU 200 may represent HLS or DASH manifests and locations of encoded segments (e.g. stored at intermediate cloud servers). As an example, the first cloud transcoder 125-1 may provide the live video feed that is being routed to the player 150. If the transcoder instance 125-1 and components upstream from the first cloud transcoder 125-1 (e.g., video source 105 and first contribution encoder 115-1) are operational, then both manifests and media segments will be updated periodically as content changes. RCU 200 monitors such changes and, as long as the RCU 200 determines the live feed is operational, it continues to send both manifests and segments received from the first cloud transcoder 125-1 to the origin server 135. The RCU 200 may determine whether the live feed is operational based, for example, on whether the feed is being regularly updated and/or other indicia of proper operation.

On the other hand, the RCU 200 receives an indication that the video feed received from the first cloud transcoder 125-1 is not operating properly (e.g., provides no output, progressively lags behind, etc.), the RCU 200 can then examine characteristics of the live video stream coming from the second cloud transcoder 125-2. If the live video stream coming from the second cloud transcoder 125-2 appears operational, the RCU 200 can then switch to that live video stream, providing the manifests and video segment locations received from the second cloud transcoder 125-2 to the origin server 135.

Because video stream delivered by first cloud transcoder 125-1 and the second cloud transcoder 125-2 are generally not precisely synchronized, additional adaptations of the video stream provided to the origin server 135 may need to be made to help minimize the impact of such switch as perceived by the end user. Some players 150, for example, may not be able to handle a switch from one video stream to another if video streams are not perfectly synchronized.

With this in mind, embodiments can include updating manifest files to allow a player 152 adapt to the switch. For example, in an HLS manifest, the manifest file can be updated to include a discontinuity marker (EXT-X-DISCONTINUITY) placed before referencing to new media segments subsequent to the switch. In a DASH manifest (DASH MPD), the manifest can be updated to indicate the beginning of a new period in the presentation, which in turn allows players to better handle discontinuities. Finally, embodiments may additionally or alternatively provide means for improved handling of discontinuities by updating media segments. For example, the last segment from chain before the switch of a first segment after the switch may be updated to include DASH or Common Media Application Format (CMAF) event carrying a new manifest within it, and thus causing media player to reload the manifest and continue processing of subsequent segments as new presentation. Alternatively, media segments after the switch may be transmuxed and updated at elementary stream levels to make such streams continuously decodable. Relevant changes can be done by updating Sequence Parameter Set (SPS), Picture Parameter Set (PPS), as well as Presentation Timestamp (PTS), Display Timestamp (DTS), Program Clock Reference (PCR) or System Clock Reference (SCR) parameters. Filler bits may also be inserted to make streams compliant at Hypothetical Reference Decoder (HRD) level. Although the system illustrated in FIG. 3 may not necessarily result in seamless switching between redundant streams, it can nevertheless minimize the impact of such switching in a way that is compliant with DASH and HLS standards. Moreover, as noted, the utilization of an RCU 200 in this manner may not require proprietary, expensive hardware to execute contribution encoders, upload links, and other components in the delivery chain.

FIG. 4 provides an example of how an HLS manifest may be modified by the RCU 200 in FIG. 3 to help minimize issues at the player 150 arising from a switch from one video stream to another. In the figure, each block includes content of a manifest (M3U8 file) for a live video stream. In this example, the content in block 410 comprises a manifest of a live video stream from the first cloud transcoder 125-1, and the content in block 420 comprises a manifest of a live video stream from the second cloud transcoder 125-2. The content in block 430 comprises the output of the RCU 200, which is capable from switching from using video stream from the first cloud transcoder 125-1 to using the video stream from the second cloud transcoder 125-2. In this example, the RCU 200 begins by forwarding the output received from the first cloud transcoder 125-1. Thus, the first portion of the content in block 430 includes the content in block 410. However, the RCU 200 subsequently switches to the second video stream from the second cloud transcoder 125-2 (e.g., in response to determining the video stream from the first transcoder 125-1 has stopped producing video segments). The latter portion of the content in block 430, therefore, includes portions of the content in block 420 received from the second cloud transcoder 125-2. Importantly, the RCU 200 inserts an indication 440 of a discontinuity in the manifest. This can signal to the player 150 the discontinuity between the first portion of the manifest in block 430 and the second portion of the manifest. With this indication, the player 150 can better handle the discontinuity without causing playback errors. For DASH, the RCU 200 can similarly provide an output manifest to indicated discontinuity by signaling the beginning of a new period in the presentation.

Figure 5:
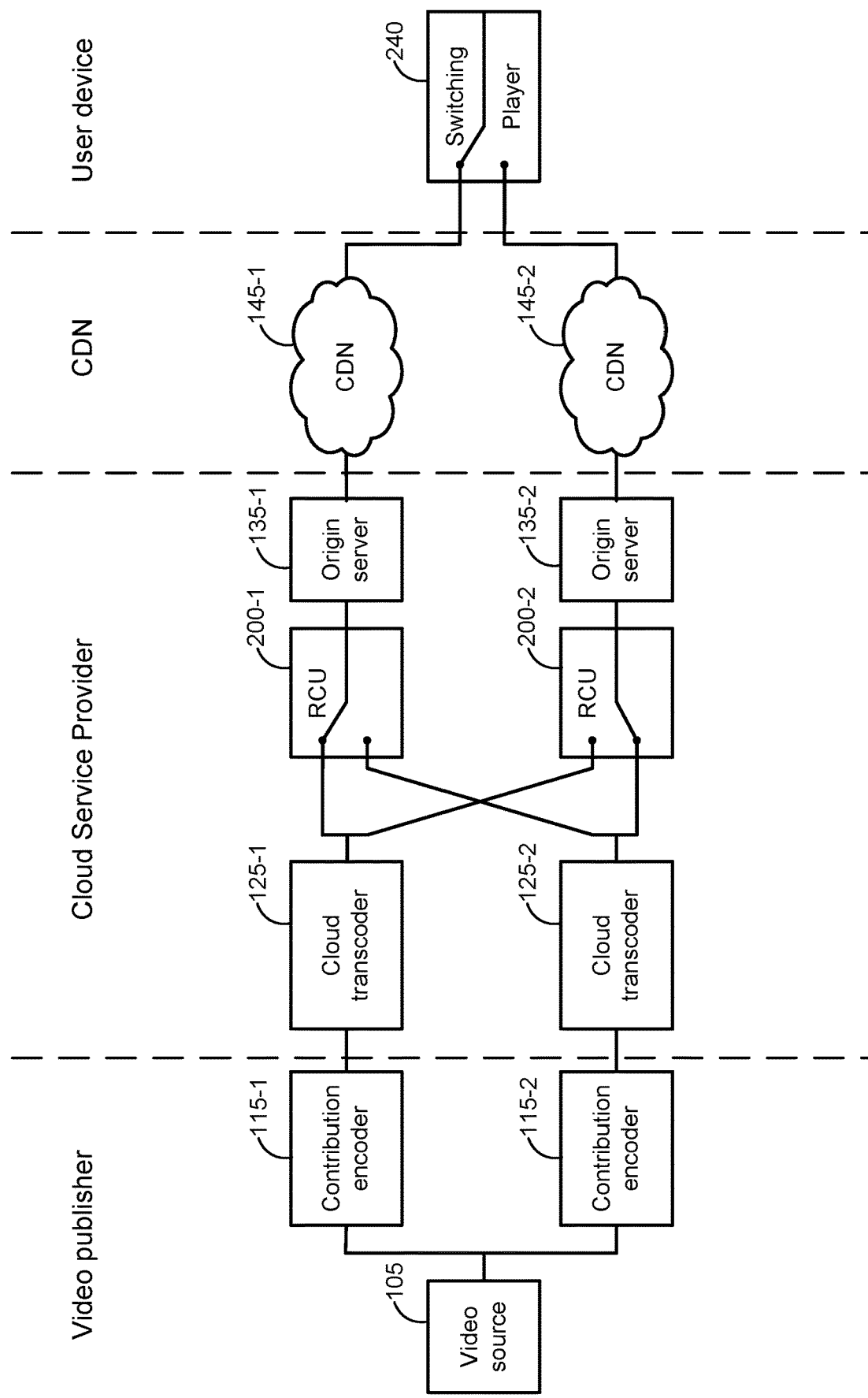
FIGS. 5-7 is a block diagram of additional embodiments of fault-tolerant video delivery systems.

FIG. 5 illustrates another embodiment of a fault-tolerant video delivery system. Similar to the system in FIG. 3, the system in FIG. 5 includes two contribution encoders 115-1 and 115-2 as well as two cloud transcoders 125-1 and 125-2. However, the system in FIG. 5 further includes redundancy in the downstream components providing against additional types of failures. These redundant components include a first RCU 200-1 and second RCU 200-2, a first origin server 135-1 and second origin server 135-2, and a first CDN 145-1 and second CDN 145-2. (Again, variations to this embodiment could include more than two components of the same type.) Additionally, because of the dual-CDN delivery to the user device, the user device can include a switching player 240.

Because of the symmetrically placed RCUs 200-1 and 200-2, two versions of content that can be delivered. It can be additionally noted that one of these versions will continue to stream even if one of the RCUs 200-1 and 200-2 fails. Delivery of the streams further passed through redundant origin servers 135-1 and 135-2 and redundant CDN's 145-1 and 145-2 (or different configurations within the same CDN 145). The use of player-side switching can be an extra fault-tolerance measure, in addition to in-cloud delivery chain switching. The switching player 240 is capable of dynamically choosing between multiple playlist URLs (or base segment URLs) in HLS and DASH implementations.

When compared with the system in FIG. 3, the additional degree of protection that system in FIG. 5 provides comes at relatively little additional implementation and operational costs. That is, the costs related to additional RCU 200, origin server 135, and CDN connection 145 are relatively low. However, since at any point in time a switching player 240 will only use one of the CDNs (145-1 or 145-2) connected, the amount of bandwidth that will be delivered by both CDNs will be identical to delivery over a single CDN. Hence, overall the operational costs will be similar.

An alternative embodiment to the system provided in FIG. 5 may utilize an additional distributed-consensus-type protocol at the RCUs 200-1 and 200-2. This can enable the RCUs 200-1 and 200-2 to coordinate switching in a way as to minimize presentation time misalignment of output streams produced in the event of switching.

Figure 6:
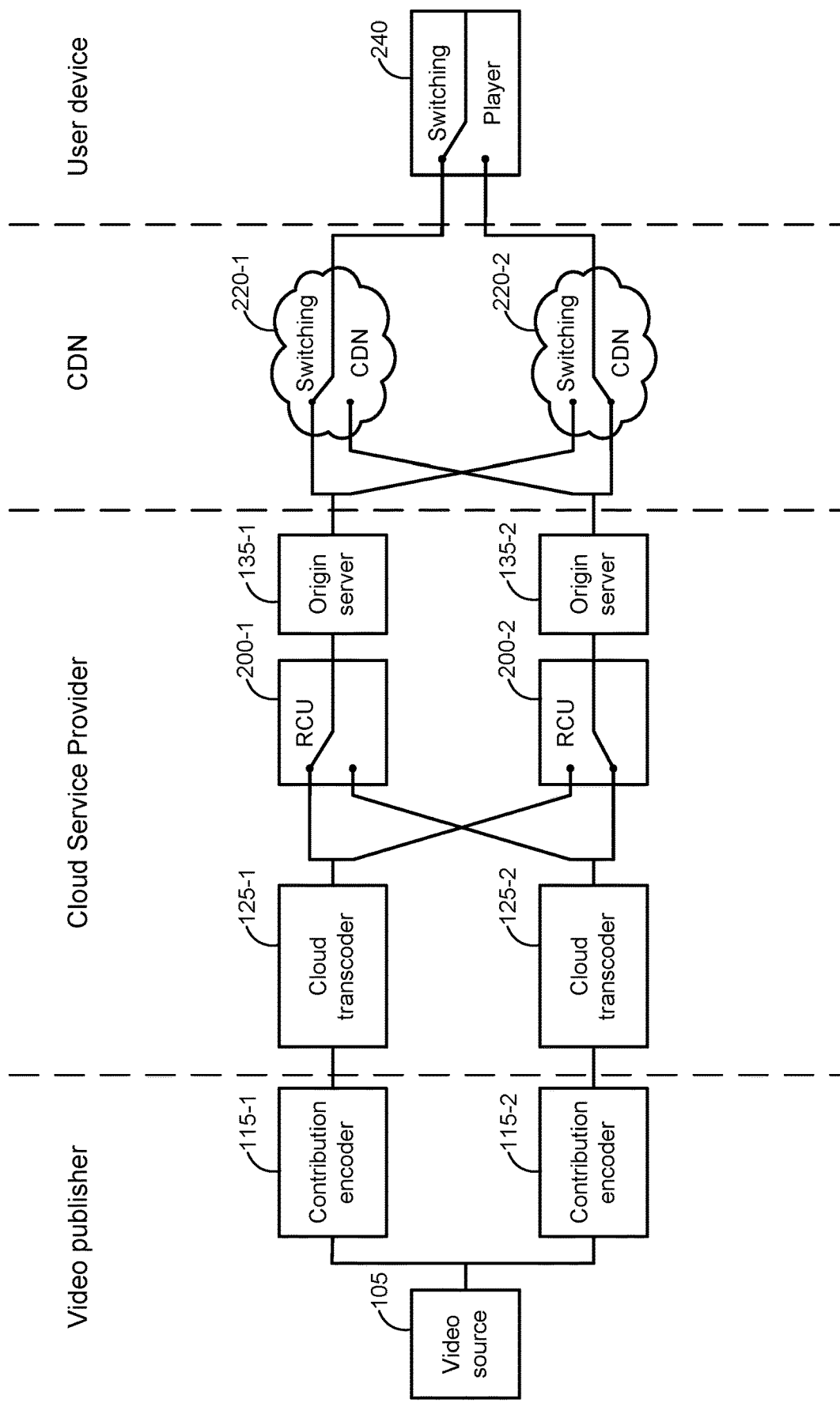

FIG. 6 illustrates another embodiment of a fault-tolerant video delivery system. The system in FIG. 6 has components and functionality similar to the system in FIG. 5, with the additional inclusion of switching CDNs 220-1 and 220-2 to provide CDN-level switching. Generally speaking, some CDNs offer Application Programming Interfaces (APIs) and capability to switch between origin servers. And thus, embodiments of fault-tolerant systems may utilize such switching to add additional fault tolerance. The system shown in FIG. 6 uses switching CDNs 220-1 and 220-2, capable of such switching, to switch between content placed on two origin servers 135-1 and 135-2. The origin servers 135-1 and 135-2 may be located in different regions, and thus the system of FIG. 6 can offer extra degree of resilience in cases when entire region of cloud service provided may become nonoperational. The use of a switching player 240 in system of FIG. 6 can also be useful in the event a CDN (e.g., either 220-1 and 220-2, or different parts of same CDN as used to enable both delivery paths) is failing.

Ultimately, the system in FIG. 6 offers layers of protection against failures, again with minimum extra implementation and operational costs as compared to systems in FIG. 3 and FIG. 5. The use of CDN-implemented delivery path switching in addition to the manifest output provided by RCUs 200-1 and 200-2 can help ensure standards compliance and minimum discontinuities in streams during a switch. Again, the use of player-side switching can serve as an extra fault-tolerance measure, in addition to switching provided by RCU is 200-1 and 200-2 and CDN's 145-1 and 145-2.

An alternative embodiment to the system provided in FIG. 6 may utilize an additional distributed-consensus-type protocol at the RCUs 200-1 and 200-2. This can enable the RCUs 200-1 and 200-2 to coordinate switching in a way as to minimize presentation time misalignment of output streams produced in the event of switching.

Figure 7:
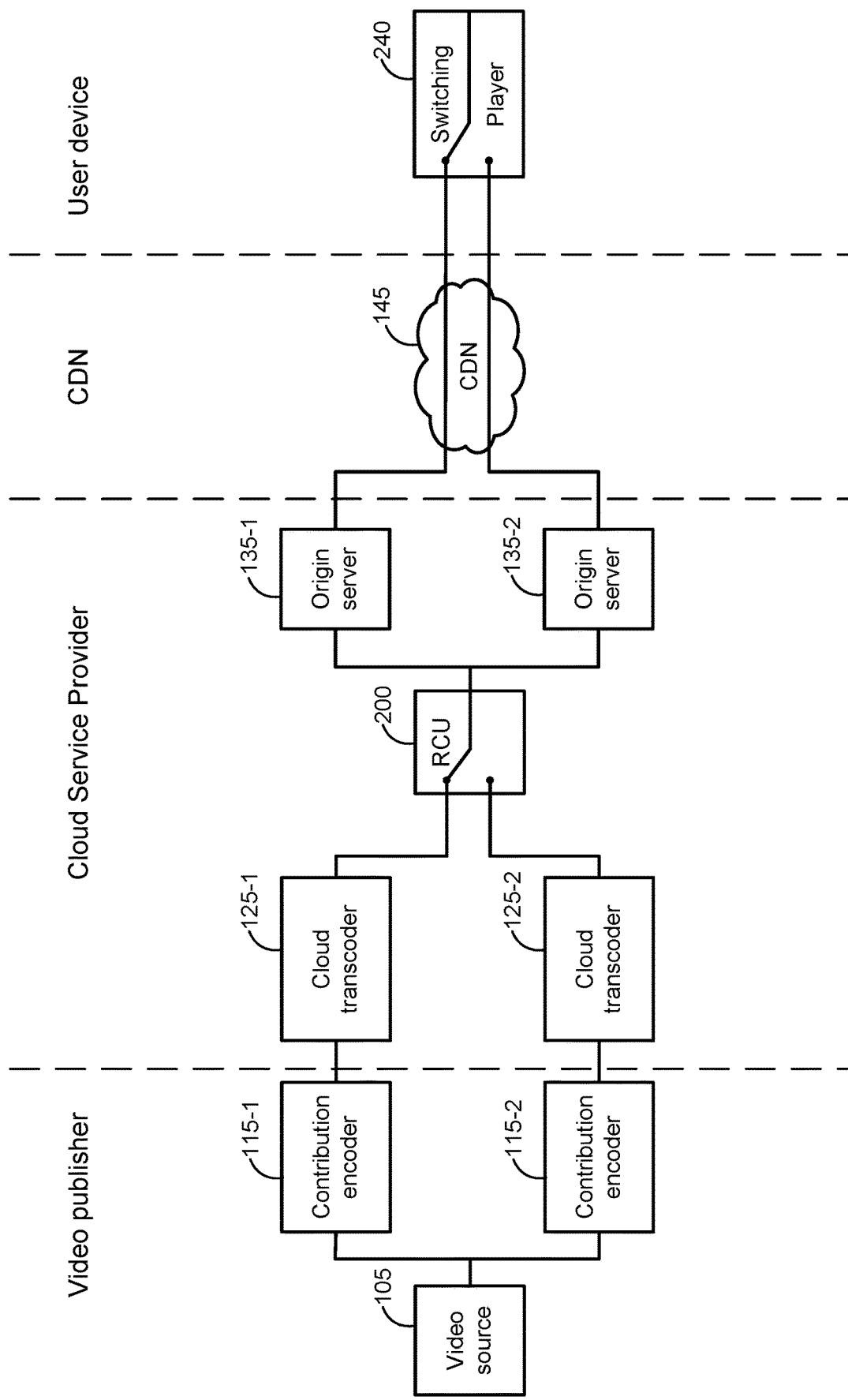

FIG. 7 illustrates yet another embodiment of a fault-tolerant video delivery system. As a variation to the previously-discussed embodiments, the embodiment illustrated in FIG. 7 combines a single RCU 200 with two origin servers 135-1 and 135-2. Further, rather than utilizing a switching CDN 220, the embodiment of FIG. 7 illustrates the use of a single CDN 145 capable of providing streams from both origin servers 135-1 and 135-2 to a switching player 240 (that chooses the origin server 135-1 or 135-2 from which to receive the video stream). Alternative embodiments to the system of FIG. 7 may utilize any of the previously-described components to provide additional or alternative fault tolerance. For example, one or more switching CDNs 220 may be used in addition or as an alternative to the switching player 240.

Figure 9:
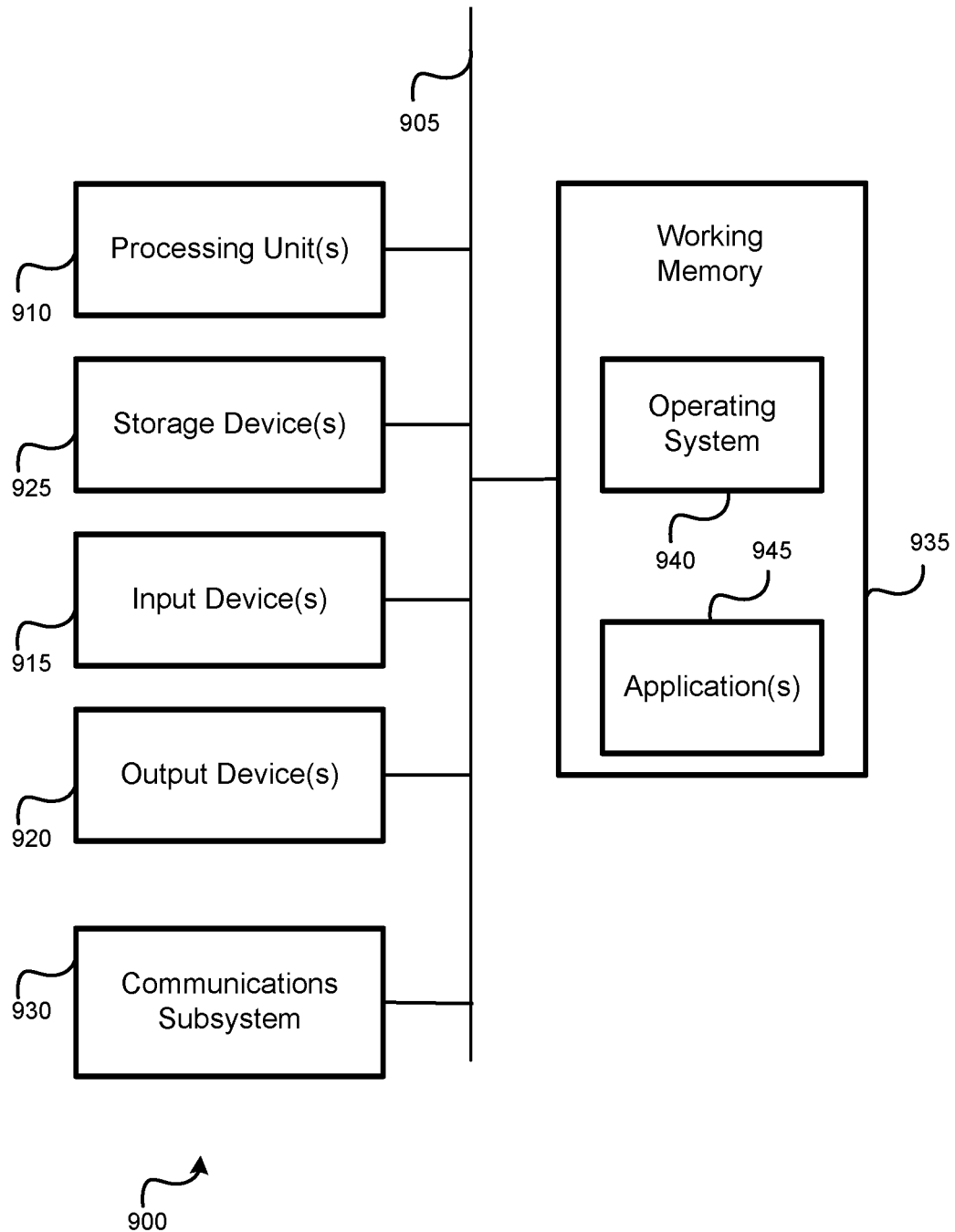
FIG. 9 is a block diagram of an embodiment of a computer system.

As noted, the various components of a fault-tolerant live video streaming systems in FIGS. 3, 5, 6, and 7 as well as alternative embodiments thereof, may be implemented on one or more computer systems. Moreover, because different video streams may be routed via computer servers in different geographical areas, it may further help avoid a fault if servers in one of the geographical areas experience an outage. An example computer system capable of implementing one or more of the components of an embodiment of a fault-tolerant live video streaming system is illustrated in FIG. 9 and described in more detail below.

It can be further noted that, although embodiments illustrated in the Appendix may use a single redundancy (e.g., use two of the same component), embodiments are not so limited. Embodiments can, for example, use multiple redundancies (e.g., more than two of the same component), if desired.

Figure 8:
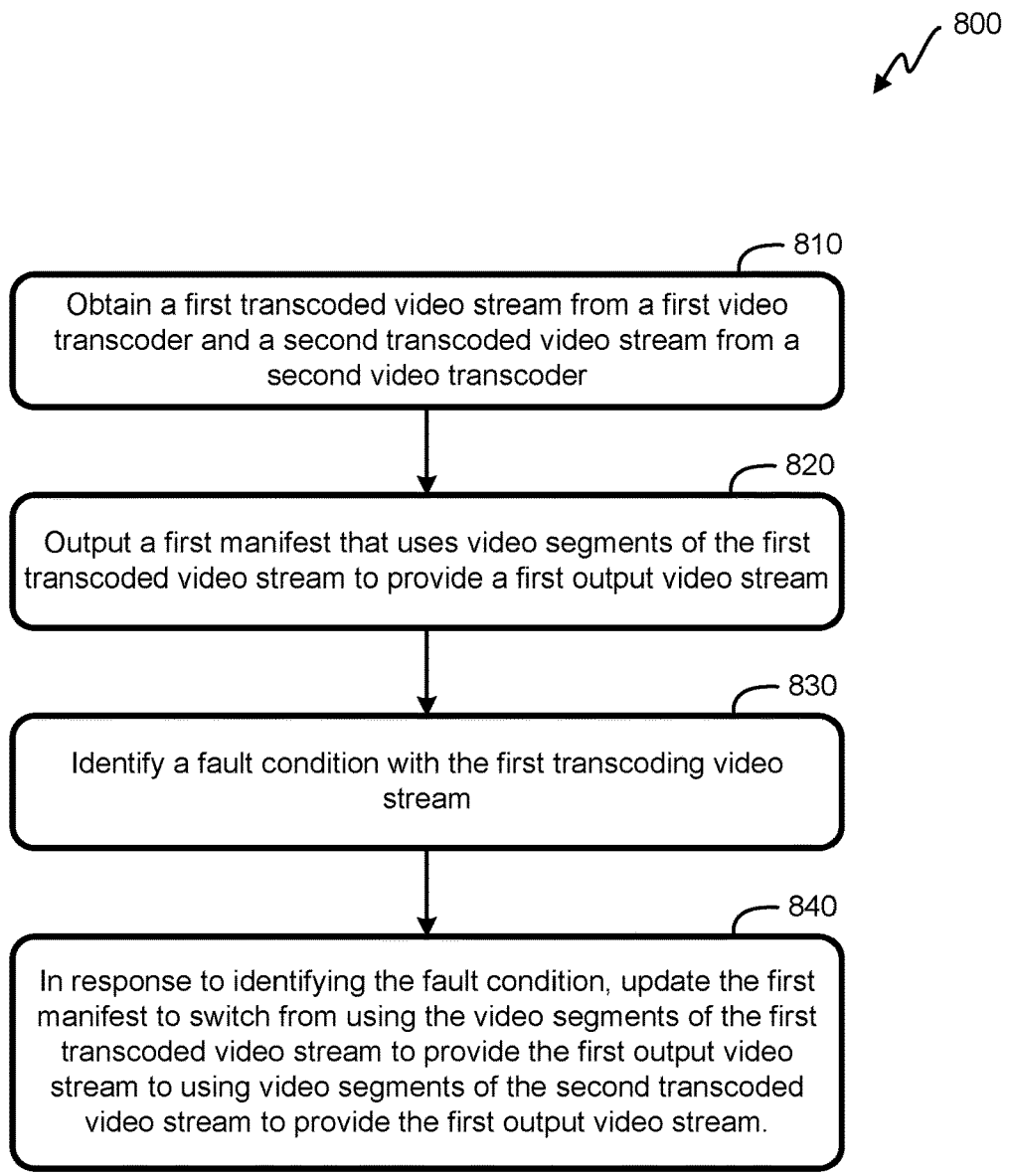
FIG. 8 is a flow diagram illustrating a method 800 of method of providing fault-tolerant live video streaming, according to an embodiment.

FIG. 8 is a flow diagram illustrating a method 800 of method of providing fault-tolerant live video streaming, according to an embodiment, which can use one or more of the techniques in the previously-described embodiments. It will be understood that the functions illustrated in FIG. 8 are provided as an example. Alternative embodiments may add, omit, combine, separate, and otherwise alter the functions as shown. The functions of one or more of the blocks illustrated in FIG. 8 may be performed, for example, by an RCU as previously described. As previously noted, an RCU may be implemented by software and/or hardware components of a computer system, such as the computer system illustrated in FIG. 9 described in more detail below.

At block 810, the functionality comprises obtaining a first transcoded video stream from a first video transcoder and a second transcoded video stream from a second video transcoder. As illustrated in the previously-described embodiments, each video transcoder may receive a video stream from a respective contribution encoder, which may encode the separate video streams from a single video source (which may comprise a set of one or more video cameras). The contribution encoders may provide video streams to the first and second video transcoders using any of a variety of formats, such as TS, TS+FEC, RTMP, SRT, or the like. In some embodiments, as noted, the first transcoded video stream and the second transcoded video stream are in an HLS format or a DASH format. The contribution encoders may provide the video streams to the first and second video transcoders via the Internet using any of a variety of communication means (including public and/or private networks, wireless and/or wired technology, etc.). In some embodiments, the first and second video transcoders may receive video streams from the respective contribution encoders via different, independent communication paths, to help ensure that, if one communication path fails, the other will not. As a person of ordinary skill in the art will appreciate, the method 800 may include obtaining additional video streams from additional transcoders (i.e., in addition to the first and second video transcoders), to provide additional redundancy.

At block 820, the functionality comprises outputting a first manifest that uses video segments of the first transcoded video stream to provide a first output video stream. More specifically, embodiments can create the first manifest based on a manifest provided by the first video transcoder. The manifest may use the same format as the manifest for the first video transcoder (e.g., if the output manifest provided by the first video transcoder is in HLS format, the first manifest may also be in HLS format).

At block 830, the functionality comprises identifying a fault condition within the first transcoding video stream. Here, the functionality may comprise monitoring the output manifest of the first video transcoder to determine whether it is being updated as expected. Because the manifest may comprise a list of URLs identifying locations at which video segments may be found, the functionality may also comprise determining whether the URLs in the manifest work. Thus, a fall condition may be identified when the first video transcoder fails to update its output manifest on time (i.e., there is a delay in the output of the first transcoded video stream of longer than a threshold amount of time) or when one of the URLs of the manifest fails to work (i.e., there is an inaccessible link to a video segment of the first transcoded video stream).

At block 840, the method comprises, in response to identifying the fault condition, updating the first manifest to switch from using the video segments of the first transcoded video stream to provide the first output video stream to using video segments of the second transcoded stream to provide the first output video stream. In some embodiments, the first manifest further includes an identifier indicating a point at which the first manifest switches from using the video segments of the first transcoded video stream to using the video segments of the second transcoded video stream. Previously noted, this identifier can comprise an indication of a discontinuity in the first output video stream, an indication of a new period within the first output video stream, and/or an indication embedded in the encoded streams by transmuxing of media segments.

Embodiments of the method 800 can vary, depending on desired functionality. For example, additional redundancies can be made. In some embodiments, a first redundancy control unit can be used to perform the functions of blocks 810-140. Such embodiments may further comprise using a second redundancy control unit to obtain the first transcoded video stream from the first video transcoder and the second transcoded video stream from the second video transcoder, and output a second manifest that uses video segments of the first transcoded video stream, the second transcoded video stream, or both, to provide a second output video stream. This can allow for CDN switching. That is, in some embodiments, the method may further comprise providing the first output video stream to a first CDN, and providing the second output video stream to a second CDN, as illustrated in FIGS. 5 and 6. Some embodiments may further output each output video stream to a CDN for additional redundancies, as illustrated in FIG. 6. As such, the method may further comprise providing the first output video stream to the second CDN, and providing the second output video stream to the first CDN.

Origin servers may be utilized differently as well, depending on desired functionality. In some embodiments, for example, where to RCUs are used, the first output video stream and second output video stream can be provided to a first origin server and second origin server respectively, as illustrated in FIGS. 5 and 6. Alternatively, a single origin server may be used (e.g., as shown in FIG. 3), or a single output video stream (e.g., the first output video stream) can be provided to a first origin server and a second origin server (e.g., as shown in FIG. 7).

FIG. 9 is a block diagram of an embodiment of a computer system 900, which may be used, in whole or in part, to perform one or more of the functions of the methods described herein, including the method shown in FIG. 8. The computer system 900 may be incorporated into one or more of the components of a system for providing fault-tolerant live video streaming, such as those illustrated in FIGS. 3 and 5-7, including components at the video publisher, cloud service provider, CDN, and/or user device.

It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different geographical locations.

The computer system 900 is shown comprising hardware elements that can be electrically coupled via a bus 905 (or may otherwise be in communication, as appropriate). The hardware elements may include processing unit(s) 910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 900 also may comprise one or more input devices 915, which may comprise without limitation a mouse, a keyboard, a camera, a microphone, and/or the like; and one or more output devices 920, which may comprise without limitation a display device, a printer, and/or the like.

The computer system 900 may further include (and/or be in communication with) one or more non-transitory storage devices 925, which can comprise, without limitation, local and/or network accessible storage, and/or may comprise, without limitation, a disk drive, a drive array, an optical storage device, a solid-state storage device, such as a Random Access Memory (RAM), and/or a Read-Only Memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices, as described herein.

The computer system 900 might also include a communications subsystem 930, which may comprise wireless communication technologies managed and controlled by a wireless communication interface, as well as wired technologies (such as Ethernet, coaxial communications, universal serial bus (USB), and the like). As such, the communications subsystem 930 may comprise a modem, a network card (wireless or wired), an infrared communication device, a wireless communication device, and/or a chipset, and/or the like, which may enable the computer system 900 to communicate on one or more communication networks with any device on the respective network, including other computer systems and/or any other electronic devices (including operations and/or applications executed thereon) described herein. Hence, the communications subsystem 930 may be used to receive and send data as described in the embodiments herein.

In many embodiments, the computer system 900 will further comprise a working memory 935, which may comprise a RAM or ROM device, as described above. Software elements, shown as being located within the working memory 935, may comprise an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as a the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a Programmable ROM (PROM), Erasable PROM (EPROM), a FLASH-EPROM, any other memory chip or cartridge as described herein, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of providing fault-tolerant live video streaming, the method comprising:
   using a first redundancy control unit to perform the steps of:
   obtaining a first transcoded video stream from a first cloud video transcoder and a second transcoded video stream from a second cloud video transcoder,
   wherein inputs to the first redundancy control unit include the first transcoded video stream and the second transcoded video stream, the first transcoded video stream consists of a first transcoded manifest and a set of first transcoded video segments produced by the first cloud video transcoder, and the second transcoded video stream consists of a second transcoded manifest and a set of second transcoded video segments produced by the second cloud video transcoder;
   outputting, to a first origin server, a first output manifest that uses the set of first transcoded video segments of the first transcoded video stream to provide a first output video stream, the first output manifest being based on the first transcoded manifest;
   monitoring the first transcoded manifest to identify a fault condition with the first transcoding video stream;
   in response to identifying the fault condition, updating the first manifest to switch from using the set of first transcoded video segments of the first transcoded video stream to provide the first output video stream to using the set of second transcoded video segments of the second transcoded video stream to provide the first output video stream, the updating of the first manifest being based on the second transcoded manifest; and
   using a second redundancy control unit to perform the steps of:

obtaining the first transcoded video stream from the first cloud video transcoder and the second transcoded video stream from the second cloud video transcoder; and outputting a second manifest that uses the video segments of the first transcoded video stream, the second transcoded video stream, or both, to provide a second output video stream.

2. The method of providing fault-tolerant live video streaming as recited in claim 1, wherein the first updated manifest is a HyperText Transfer Protocol (HTTP) Live Streaming (HLS) manifest comprising an EXT-X-DISCONTINUITY marker placed prior to using the video segments of the second transcoded video stream."

3. The method of providing fault-tolerant live video streaming as recited in claim 1, wherein the first updated manifest is a DASH manifest, which declares the video segments of the second transcoded video stream as a new period in media presentation.

4. The method of providing fault-tolerant live video streaming as recited in claim 1, wherein the first updated manifest is a DASH manifest that is further encoded and placed as Dynamic Adaptive Streaming over HTTP (DASH) or Common Media Application Format (CMAF) event message in a last media segment from first video stream before the switch, or in first video segment of the second transcoded video stream after the switch.

5. The method of providing fault-tolerant live video streaming as recited in claim 1, wherein updating the video segments of the second transcoded video stream comprises modifying:
   a Sequence Parameter Set (SPS),
   a Picture Parameter Set (PPS),
   a Presentation Timestamp (PTS),
   a Display Timestamp (DTS),
   a Program Clock Reference (PCR), or
   System Clock Reference (SCR),
   or any combinations thereof.

6. The method of providing fault-tolerant live video streaming as recited in claim 1, wherein the fault condition comprises:
   a delay in the output of the first transcoded video stream of longer than a threshold amount of time,
   an inaccessible link to a video segment of the first transcoded video stream, or
   any combination thereof.

7. The method of providing fault-tolerant live video streaming as recited in claim 1, further comprising:
   providing the first output video stream to a first Content Delivery Network (CDN); and
   providing the second output video stream to a second CDN.

8. The method of providing fault-tolerant live video streaming as recited in claim 1, further comprising:
   providing the first output video stream to the second CDN; and
   providing the second output video stream to the first CDN.

9. The method of providing fault-tolerant live video streaming as recited in claim 1, further comprising:
   providing the first output video stream to the first origin server; and
   providing the second output video stream to a second origin server.

10. The method of providing fault-tolerant live video streaming as recited in claim 1, further comprising:
    providing the first output video stream to the first origin server and a second origin server.

11. A system for providing fault-tolerant live video streaming, the system comprising:
    a memory; and
    one or more processing units communicatively coupled with the memory and configured to:
    obtain by a first redundancy control unit, a first transcoded video stream from a first cloud video transcoder and a second transcoded video stream from a second cloud video transcoder,
    wherein inputs to the first redundancy control unit include the first transcoded video stream and the second transcoded video stream, the first transcoded video stream consists of a first transcoded manifest and a set of first transcoded video segments produced by the first cloud video transcoder, and the second transcoded video stream consists of a second transcoded manifest and a set of second transcoded video segments produced by the second cloud video transcoder;
    output by the first redundancy control unit, to a first origin server, a first output manifest that uses the set of first transcoded video segments of the first transcoded video stream to provide a first output video stream, the first output manifest being based on the first transcoded manifest;
    monitor by the first redundancy control unit, the first transcoded manifest to identify a fault condition with the first transcoding video stream;
    in response to identifying the fault condition, update the first manifest to switch from using the set of first transcoded video segments of the first transcoded video stream to provide the first output video stream to using the set of second transcoded video segments of the second transcoded video stream to provide the first output video stream, the updating of the first manifest being based on the second transcoded manifest;
    obtain by a second redundancy control unit, the first transcoded video stream from the first cloud video transcoder and the second transcoded video stream from the second cloud video transcoder; and
    output by the second redundancy control unit, a second manifest that uses the video segments of the first transcoded video stream, the second transcoded video stream, or both, to provide a second output video stream.

12. The system for providing fault-tolerant live video streaming as recited in claim 11, wherein the first updated manifest is a HyperText Transfer Protocol (HTTP) Live Streaming (HLS) manifest comprising an EXT-X-DISCONTINUITY marker placed prior to using the video segments of the second transcoded video stream."

13. The system for providing fault-tolerant live video streaming as recited in claim 11, wherein the first updated manifest is a DASH manifest, which declares the video segments of the second transcoded video stream as a new period in media presentation.

14. The system for providing fault-tolerant live video streaming as recited in claim 11, wherein the first updated manifest is a DASH manifest that is further encoded and placed as Dynamic Adaptive Streaming over HTTP (DASH) or Common Media Application Format (CMAF) event message in a last media segment from first video stream before the switch, or in first video segment of the second transcoded video stream after the switch.

15. The system for providing fault-tolerant live video streaming as recited in claim 11, wherein updating the video segments of the second transcoded video stream comprises modifying:

a Sequence Parameter Set (SPS),
a Picture Parameter Set (PPS),
a Presentation Timestamp (PTS),
a Display Timestamp (DTS),
a Program Clock Reference (PCR), or
System Clock Reference (SCR),
or any combinations thereof.

16. The system for providing fault-tolerant live video streaming as recited in claim 11, wherein the fault condition comprises:
    a delay in the output of the first transcoded video stream of longer than a threshold amount of time,
    an inaccessible link to a video segment of the first transcoded video stream, or
    any combination thereof.

17. The system for providing fault-tolerant live video streaming as recited in claim 1, further comprising:
    providing the first output video stream to a first Content Delivery Network (CDN); and
    providing the second output video stream to a second CDN.

18. The system for providing fault-tolerant live video streaming as recited in claim 1, further comprising:
    providing the first output video stream to the second CDN; and
    providing the second output video stream to the first CDN.

19. The method of providing fault-tolerant live video streaming as recited in claim 1, further comprising:
    providing the first output video stream to the first origin server; and
    providing the second output video stream to a second origin server.

20. A non-transitory computer-readable medium having instructions stored thereby, which, when executed by one or more processing units, cause the one or more processing units to:
    obtain by a first redundancy control unit, a first transcoded video stream from a first cloud video transcoder and a second transcoded video stream from a second cloud video transcoder,
    wherein inputs to the first redundancy control unit include the first transcoded video stream and the second transcoded video stream, the first transcoded video stream consists of a first transcoded manifest and a set of first transcoded video segments produced by the first cloud video transcoder, and the second transcoded video stream consists of a second transcoded manifest and a set of second transcoded video segments produced by the second cloud video transcoder;
    output by the first redundancy control unit, to a first origin server, a first output manifest that uses the set of first transcoded video segments of the first transcoded video stream to provide a first output video stream, the first output manifest being based on the first transcoded manifest;
    monitor by the first redundancy control unit, the first transcoded manifest to identify a fault condition with the first transcoding video stream;
    in response to identifying the fault condition, update the first manifest to switch from using the set of first transcoded video segments of the first transcoded video stream to provide the first output video stream to using the set of second transcoded video segments of the second transcoded video stream to provide the first output video stream, the updating of the first manifest being based on the second transcoded manifest;
    obtain by a second redundancy control unit, the first transcoded video stream from the first cloud video transcoder and the second transcoded video stream from the second cloud video transcoder; and
    output by the second redundancy control unit, a second manifest that uses the video segments of the first transcoded video stream, the second transcoded video stream, or both, to provide a second output video stream.

* * * * *